US007876663B2

(12) United States Patent  
Lantz et al.

(10) Patent No.: US 7,876,663 B2  
(45) Date of Patent: Jan. 25, 2011

(54) SCANNING SYSTEM FOR A PROBE STORAGE DEVICE

(75) Inventors: Mark A. Lantz, Adliswil (CH); Hugo E. Rothuizen, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 483 days.

(21) Appl. No.: 11/955,546

(22) Filed: Dec. 13, 2007

(65) Prior Publication Data

US 2009/0154328 A1    Jun. 18, 2009

(51) Int. Cl.  
*G11B 9/00* (2006.01)

(52) U.S. Cl. ..................................... 369/126
(58) Field of Classification Search ............ 369/126, 369/170  
See application file for complete search history.

(56) References Cited

U.S. PATENT DOCUMENTS

| | | | |
|---|---|---|---|
| 5,009,473 | A | 4/1991 | Hunter et al. |
| 5,834,864 | A * | 11/1998 | Hesterman et al. .... 310/40 MM |
| 5,986,381 | A | 11/1999 | Hoen et al. |
| 6,501,210 | B1 | 12/2002 | Ueno |
| 6,583,524 | B2 | 6/2003 | Brandt |
| 6,639,313 | B1 | 10/2003 | Martin et al. |
| 6,911,667 | B2 | 6/2005 | Pichler et al. |
| 6,953,985 | B2 | 10/2005 | Lin et al. |
| 6,969,635 | B2 | 11/2005 | Patel et al. |
| 7,132,721 | B2 | 11/2006 | Platt et al. |
| 7,372,025 | B2 | 5/2008 | Hoen et al. |
| 2003/0057803 | A1 | 3/2003 | Hartwell |
| 2004/0245462 | A1 | 12/2004 | Binnig et al. |
| 2007/0268099 | A1 | 11/2007 | Jeong et al. |

OTHER PUBLICATIONS

J. Fernando Alfaro and Gary K. Fedder, Actuation for Probe-Based Mass Data Storage, p. 1-4, Carnegie Mellon University, Pittsburgh.  
Y. Lu et al., Design, Fabrication and Control of a Micro X-Y Stage with Large Ultra-thin Film Recoding Media Platform, Proceedings of the 2005 IEEE/ASME International Conference on Advanced Intelligent Mechatronics, Jul. 2005, p. 19-24, Monterey.  
Mark A. Lantz et al., A Vibration Resistant Nanopositioner for Mobile Parallel-Probe Storage Applications, Journal for Microelectronical Systems, Feb. 2007, p. 130-139, vol. 16, No. 1, IEEE.

* cited by examiner

*Primary Examiner*—Daniell L Negrón  
*Assistant Examiner*—Nicholas Lee  
(74) *Attorney, Agent, or Firm*—Cantor Colburn LLP; Stephen Kaufman

(57) ABSTRACT

A scanning system includes a base plate, an anchor structure mounted to the base plate, and a first O-topology bracket moveably mounted along a first axis of an X-Y plane to the anchor structure. The first O-topology bracket is resiliently interconnected to the anchor structure by a plurality of parallelization springs. A second O-topology bracket is moveably mounted along a second axis of the X-Y plane to the first O-topology bracket. The second O-topology bracket is resiliently interconnected to the first O-topology bracket through a second plurality of parallelization springs. The first and second O-topology brackets provide a robust, vibration resistant structure that resists both in-plane and out-of-plane deformations to enable sub-nanometer tracking.

3 Claims, 1 Drawing Sheet

SCANNING SYSTEM FOR A PROBE STORAGE DEVICE

BACKGROUND OF THE INVENTION

1. Field of the Invention

This invention relates to the art of probe storage devices and, more particularly, to a scanning system for a probe storage device.

2. Description of Background

Parallel probe-based data-storage systems are currently being developed for future data-storage applications. A parallel probe-based system employs a large array of atomic-force microscopic probes that read, write and erase data on a storage medium carried by and X/Y scanning system. The large array of probes enables very high storage densities to be achieved. Moreover, by operating the array of probes in parallel, high data transfer rates are also achievable. The high storage capacity, combined with rapid transfer rates, enables the storage system to be built into a small package that is ideal for mobile storage applications.

Mobile storage applications present a variety of engineering challenges. First, mobile storage systems must be robust against vibration and shock. Second, mobile storage system must be capable of operating on a restricted power budget. A mobile probe based storage system should be capable of maintaining sub-nanometer tracking performance while being subjected to mechanical shocks that create accelerations approaching 10's of g's. However, making a mechanical devise more robust, i.e., capable of withstand high accelerations typically requires making components stiffer. Existing scanning systems employ a "C"-topology frame that supports a scan table for movement along a single axis of an X-Y plane. The "C"-topology frame suffers from undesirable shear and bending deformations which impose limits on maintaining sub-nanometer tracking. That is, in order to maintain high tracking accuracies, components of the probe storage device must be made stiffer. The additional, stiffer, components possess power requirements that render the probe storage device less desirable for mobile applications.

SUMMARY OF THE INVENTION

The shortcomings of the prior art are overcome and additional advantages are provided through the provision of a scanning system for a probe storage device. The scanning system includes a base plate, an anchor structure mounted to the base plate, and a first O-topology bracket moveably mounted along a first axis of an X-Y plane to the anchor structure. The first O-topology bracket is resiliently interconnected to the anchor structure by a plurality of parallelization springs. A second O-topology bracket is moveably mounted along a second axis of the X-Y plane to the first O-topology bracket. The second O-topology bracket is resiliently interconnected to the first O-topology bracket through a second plurality of parallelization springs. The first and second O-topology brackets provide a robust, vibration resistant structure that resists both in-plane and out-of-plane deformations to enable sub-nanometer tracking for the scanning system.

Additional features and advantages are realized through the techniques of exemplary embodiments of the present invention. Other embodiments and aspects of the invention are described in detail herein and are considered a part of the claimed invention. For a better understanding of the invention, with advantages and features thereof, refer to the description and to the drawings.

BRIEF DESCRIPTION OF THE DRAWINGS

The subject matter which is regarded as the invention is particularly pointed out and distinctly claimed in the claims listed at the conclusion of the specification. The foregoing and other objects, features, and advantages of the invention are apparent from the following detailed description taken in conjunction with the accompanying drawings in which:

Figure 1:
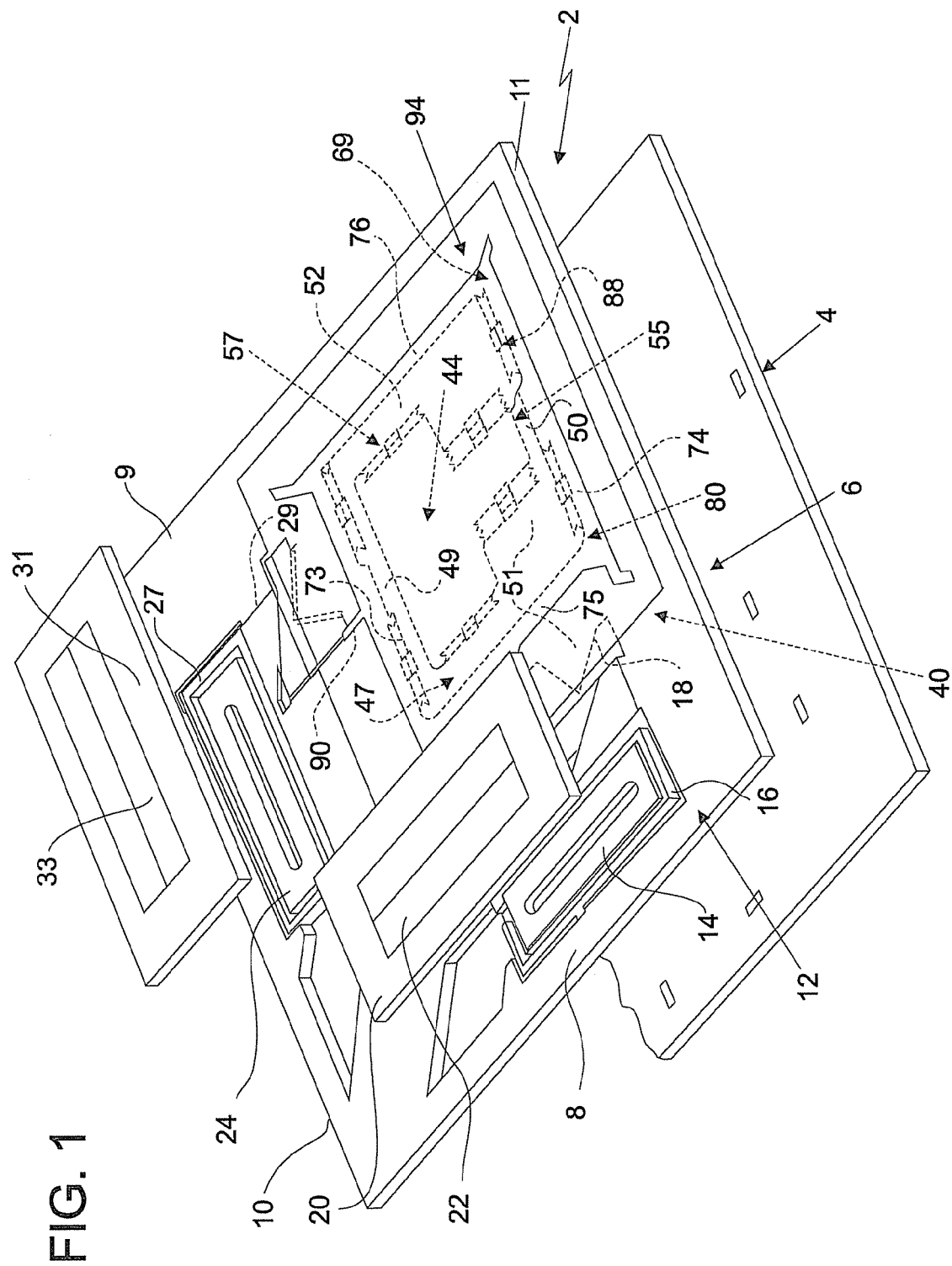
FIG. 1 illustrates a partially exploded perspective view of a scanning system for a probe storage device constructed in accordance with an exemplary embodiment of the present invention.

The detailed description explains the exemplary embodiments of the invention, together with advantages and features thereof, by way of example with reference to the drawings.

DETAILED DESCRIPTION OF THE INVENTION

With initial reference to FIG. 1, a scanning system, constructed in accordance with an exemplary embodiment of the present invention, is generally indicated at 2. Scanning system 2 includes a base plate 4 and a scanning chip 6. Scanning chip 6 includes first and second opposing side edges 8 and 9 interconnect by corresponding third and fourth side edges 10 and 11 that collectively define a substantially planner main body 12. Scanner chip 6 includes a first coil 14 mounted within a shuttle 16 that is moveably positioned within main body 12. As shown, first coil 14 is connected to an actuating arm 18. A first top plate 20 is positioned above first coil 14 and is provided with a first magnet 22. First coil 14 is selectively supplied with an electrical current to generate a magnetic field causing shuttle 16 to translate along a first axis of an X/Y plane defined by main body 12. Scanning chip 6 also includes a second coil 24 mounted within a shuttle 27 that is selectively shiftable along a second axis, that is orthogonal to the first axis, of the X/Y plane defined by main body 12. In a manner similar to that described above, second shuttle 27 is connected to second actuating arm 29. In a manner also similar to that described above, a second top plate 31 is positioned above a second coil 24 and includes a second magnet 33.

In accordance to the exemplary embodiment shown, scanning system 2 further includes a suspension system 40 including an anchor structure 44 that is fixedly secured to base plate 4. Suspension system 40 further includes a first O-topology bracket 47 having first and second opposing side elements 49 and 50 interconnected by third and fourth opposing side element 51 and 52 that collectively define a central opening 55. At this point it should be understood that the term "O-topology" bracket refers to a bracket having a continuous, uninterrupted, outer frame that defines a central opening. In any case, first O-topology bracket 47 is moveably mounted to anchor structure 44. More specifically, first O-topology bracket 47 is resiliently interconnected to anchor structure 44 through a first plurality of parallelization springs, one of which is indicated at 57. First plurality of parallelization springs 57 extend along an axis that is substantially parallel to first and second side edges 8 and 9 of scanner chip 6.

Suspension system 40 is also shown to include a second O-topology bracket 69 having first and second opposing side members 73 and 74 interconnected by third and fourth opposing side members 75 and 76 that collectively define a central opening 80. Second O-topology bracket 69 is resiliently mounted to first O-topology bracket 47 through a second plurality of parallelization springs, one of which is indicated at 88. Second plurality of parallelization springs 88 extend along an axis that is substantially parallel to third and fourth side edges 10 and 11 of the scanning chip 6.

As shown, second O-topology bracket 69 includes a first connector member 90 that is operatively connected to second actuating arm 29 and a second connector member (not shown) that is operatively connected to first actuating arm 18. With this arrangement, application of an electrical current to first and second coils 14 and 24 generates a magnetic field that selectively shifts first and second shuttles 16 and 27 within main body 12 along the first and second orthogonal axes. As shuttles 16 and 27 move within main body 27, actuating arms 18 and 29 selectively shift second O-topology brackets 69 along corresponding first and second orthogonal axes in order to shift scan table 94 to a predetermined location relative to a plurality of parallel probes (not shown).

By forming first and second O-topology brackets 47 and 69 as a continuous, closed structure, the present invention provides a robust, vibration resistant structure that resists both in-plane and out-of-plane deformations to enable sub-nanometer tracking of scan table 94 relative to the plurality probes. With this arrangement, scanning system 2 can be constructed in a small package so as to be readily adapted for mobile data storage applications. Moreover, by forming first and second O-topology brackets 47 and 69 as closed structures, there is no need to stiffen other components in scanning system 2 in order to resist vibrations. Thus, power requirements remain at optimal level for mobile storage applications. Of course, while the scanning system is described as being configured for mobile data storage applications, it should be readily apparent that scanning system 2 can also be employed in other data storage applications such as, for example, in connection with a redundant array of independent discs or RAID-like system used in data archive applications.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

The invention claimed is:

1. A scanning system for a probe storage device comprising:
   a base plate;
   an anchor structure mounted to the base plate;
   a first O-topology bracket moveably mounted along a first axis of an X-Y plane to the anchor structure;
   a first plurality of springs resiliently interconnecting the first O-topology bracket and the anchor structure;
   a second O-topology bracket moveably mounted along a second axis of the X-Y plane to the first O-topology bracket; and
   a second plurality of springs resiliently interconnecting the second O-topology bracket and the first O-topology bracket, wherein the first and second O-topology brackets provide a robust, vibration resistant structure that resists both in-plane and out-of-plane deformations to enable sub-nanometer tracking.

2. The scanning system according to claim 1, wherein the first plurality of springs are arranged orthogonal to the second plurality of springs.

3. The scanning system according to claim 2, further comprising: a scan table mounted to the second O-topology bracket, the scan table being selectively moveable along the first axis of the X-Y plane upon movement of the first O-topology bracket and along the second axis of the X-Y plane upon movement of the second O-topology frame.

* * * * *